UNITED STATES PATENT OFFICE.

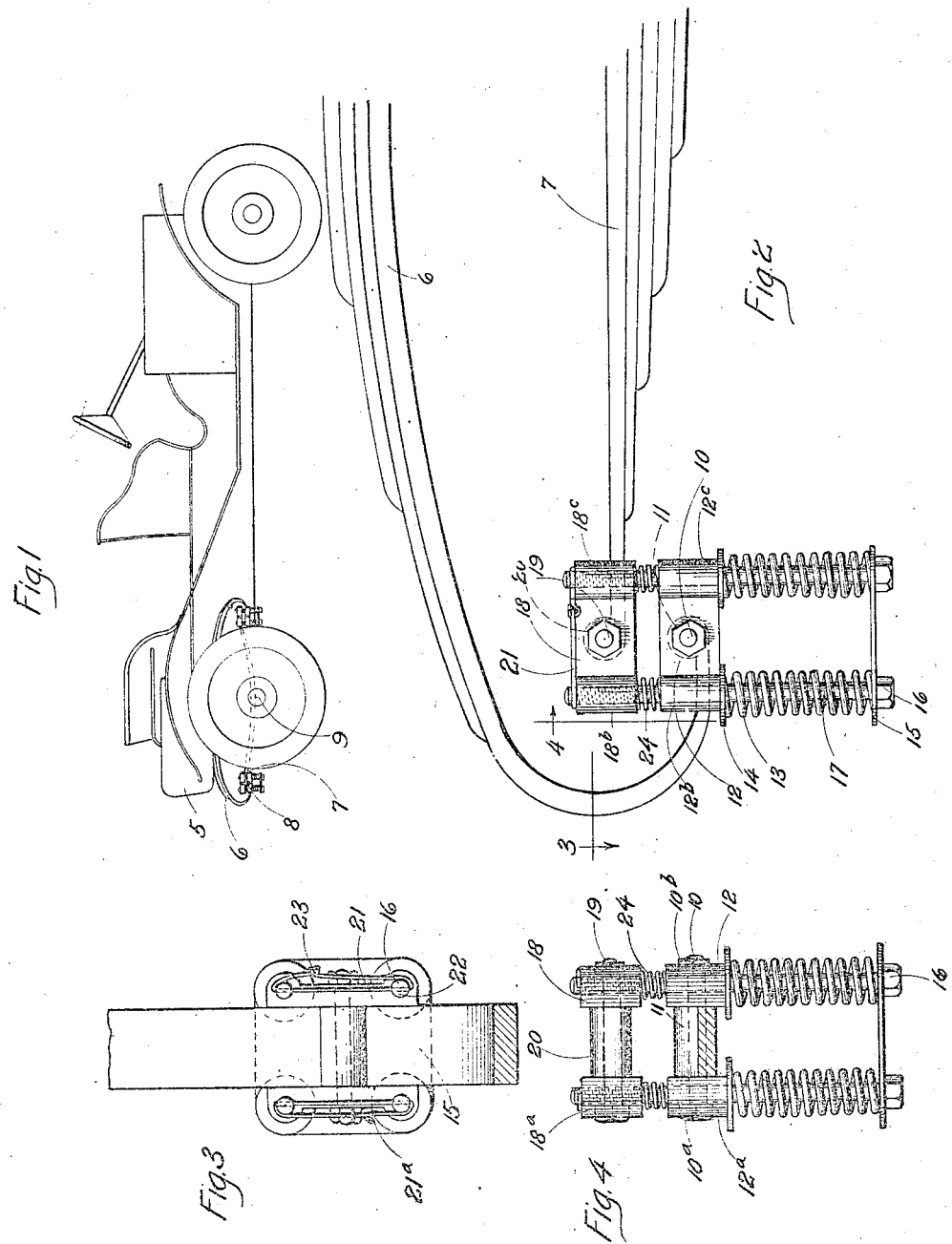

CHARLES ARTHUR TILT, OF CHICAGO, ILLINOIS, ASSIGNOR TO JOHN W. BLACKLEDGE, OF CHICAGO, ILLINOIS.

AUTOMOBILE-SPRING.

988,229.

Specification of Letters Patent. Patented Mar. 28, 1911.

Application filed October 9, 1909. Serial No. 521,805.

*To all whom it may concern:*

Be it known that I, CHARLES ARTHUR TILT, a citizen of the United States, residing at Chicago, in the county of Cook and State of Illinois, have invented certain new and useful Improvements in Automobile-Springs, of which the following is a specification.

My invention relates in general to vehicle springs, and particularly to supplementary springs and their connections with the elliptic side springs of automobiles.

The object of my invention is to provide additional or supplementary springs at the point of connection of the members of the elliptical springs with each other.

A further object is to so construct the parts that support or carry said supplementary springs that they may serve as a connecting link between the top and bottom members of the elliptical side springs.

A particular object of my improvement is to prevent the lateral movements between the upper or body spring and the lower or axle spring relatively to each other, without interfering with the relative vertical movements of the springs.

I have also provided other smaller springs to receive and cushion the upward movements of the parts, in addition to the main supplementary springs above mentioned which carry the weight of the body of the automobile.

Other objects and advantages of my improvements will be made apparent in the following specification and claims, taken in connection with the accompanying drawings, in which—

Figure 1 is a side elevation of an automobile, showing the location of the springs referred to. Fig. 2 is an enlarged side elevation of my improvements as connected to the ordinary elliptic side springs of automobiles or other vehicles. Fig. 3 is a plan view of the same. Fig. 4 is an end elevation of the same.

The same reference characters are used to designate the same parts in the several views of the drawings.

Referring to Fig. 1 of the drawings, the vehicle body 5 rests upon and is fixed to the upper elliptic side spring 6. The lower elliptic side spring 7 rests upon and is fixed to the axle 9. The said springs are commonly connected at the point 8 by a swinging link, or by supplementary spiral springs which take the place of said link and perform its functions, as well as provide additional resilient supporting means for the automobile body.

Referring particularly to Fig. 2, it will be seen that the upper elliptic side spring 6 is pivotally attached at the extreme end of its downwardly curved portion to the bolt or pin 10 by means of the eye or loop 11 in the end of said spring. The bolt 10 is carried by two vertically sliding blocks 12 and 12ª, one at each end of said bolt. The looped end 11 of the spring 6 lies between the sliding blocks 12 and 12ª. The sliding blocks are held in position relatively to said loop 11 and the bolt 10 by the head 10ª at one end and the nut 10ᵇ at the other end. The blocks 12 and 12ª rest upon spiral compression springs 13. Washers 14 are placed between said blocks and the upper ends of said springs. The lower ends of the springs 13 rest upon a plate 15 and said plate is carried by the heads 16 of bolts 17. The plate 15, therefore, holds four of the bolts 17 in their proper relative positions, as shown more clearly in Fig. 3. The bolts 17 extend upwardly through the springs 13 and are slidably fitted within the ends 12ᵇ and 12ᶜ of the blocks 12 and 12ª. The ends 12ᵇ and 12ᶜ are suitably enlarged at the points where the bolts pass through them. The said bolts 17 are threaded into other blocks 18 and 18ª, which are similar to the blocks 12 and 12ª. The only difference between the blocks 12, 12ª and the blocks 18, 18ª is that the former are loosely fitted upon the bolts 17 while the latter are threaded thereto. It will, therefore, be seen that the blocks 12, 12ª are free to slide longitudinally of the bolts, while the blocks 18 are fixed upon the ends of said bolts. The blocks 18, 18ª are also held in position by a bolt 19 and said bolt 19 passes through an eye or loop 20 in the extreme end of the lower side spring 7. The lower side spring 7 is pivotally attached to the bolt 19, and hence to the upper pair of blocks 18, 18ª. The bolts 17 are locked against turning and becoming loosened in the blocks 18 and 18ª by the wires 21 and 21ª, each of which is put through an aperture 22 in the end of each bolt. The ends of the wire 21 are finally twisted together at 23. The smaller springs 24, of which there are four in number, one around each of the bolts 17, are placed between the sliding blocks 12, 12ª and the blocks 18, 18ª. These springs 24 serve to receive and to cushion the sudden upward movements of the lower blocks 12, 12ª and of the automobile body which is connected thereto through the spring 6.

The operation of my improvements is substantially as follows: The weight of the body of the automobile and the load which it carries is transmitted through the elliptic side spring 6 to the lower sliding blocks 12, 12ª. The side spring 6 being pivotally attached to these blocks by means of a bolt 10, the said weight is transmitted, as above described, in any of the various angular positions which the parts may assume. The said weight is then transmitted to the spiral springs 13 and they in turn transmit the weight to the plate 15, which in turn transmits said weight to the heads of the bolts 17. The bolts 17 carry the weight to the blocks 18 and 18ª, which finally give it to the bolt or pin 19 at the end of the lower elliptic side spring 7.

It will be seen that the weight of the automobile body and its load is at all times carried by the additional springs 13 and a greater resilient effect is thus produced.

An important effect of my construction lies in the sliding engagement of the bolts 17 in the blocks 12, 12ª, by which means the blocks 18, 18ª and the blocks 12, 12ª are constrained to move in alinement. It will, therefore, be seen that relative lateral movement of the ends of the upper elliptic spring 6 and lower elliptic spring 7 is prevented. While the above described lateral movement is prevented, my improved construction does not in any way interfere with the longitudinal swinging movements of the parts. The combination of parts which compose my improvements, taken as a whole, serve as a swinging link for connecting the said elliptic springs. They have the further advantage of resiliency while serving as a simple link.

The smaller springs 24 provide a very desirable cushioning effect in arresting sudden return movements of the blocks 12, 12ª relatively to the blocks 18, 18ª. It is evident that I could use rubber washers or any other suitable form of buffer in place of the springs 24.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

I claim:

1. The combination with the two members of a vehicle elliptical spring, of two pairs of vertical guides, means for securing the end of the lower member of the spring between the pairs of guides, two pairs of sleeves surrounding said guides, means for pivotally supporting the end of the upper member of the spring between and directly by the pairs of sleeves, a plate secured to the lower ends of said guides, and coiled springs surrounding said guides and supported intermediate of said plate and said sleeves.

2. The combination with the two members of a vehicle elliptical spring, of a pair of blocks between which one end of one member of the spring is pivotally secured, a pair of guides rigidly connected to and depending from each block, a second pair of blocks having extended sliding engagements with the corresponding pairs of guides, means for pivotally connecting the end of the other member of the spring between said second pair of blocks, coiled springs surrounding said guides beneath said second pair of blocks, and means on said guides for supporting the lower ends of the coiled springs.

3. The combination with the two members of a vehicle elliptical spring, of a pair of blocks between which one end of one member of the spring is pivotally secured, a pair of guides rigidly connected to and depending from each block, a second pair of blocks having extended sliding engagements with the corresponding pairs of guides, means for pivotally connecting the end of the other member of the spring between said second pair of blocks, coiled springs surrounding said guides beneath said second pair of blocks, means on said guides for supporting the lower ends of the coiled springs, and coiled springs surrounding said guides intermediate of the upper and lower pairs of blocks.

In testimony whereof, I have subscribed my name.

CHARLES ARTHUR TILT.

Witnesses:
   Geo. L. Wilkinson,
   Anna L. Walton.